United States Patent Office 2,827,483
Patented Mar. 18, 1958

2,827,483

TRIALKYLAMINE SALTS OF DITHIOCARBANILIC ACIDS

Bryant C. Fischback, Walnut Creek, and Guy H. Harris, Concord, Calif., assignors to The Dow Chemical Company, Midland, Mich., a corporation of Delaware No Drawing. Application October 28, 1955
Serial No. 543,620

6 Claims. (Cl. 260—501)

The present invention is concerned with trialkylamine salts of dithiocarbanilic acids of the formula

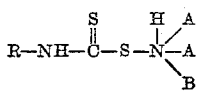

In this and succeeding formulae, R represents a nonacidic homocyclic aromatic radical of the benzene series, each A represents an alkyl radical containing from 1 to 3 carbon atoms, inclusive, and B represents an alkyl radical containing from one to 12 carbon atoms, inclusive. The expression "non-acidic homocyclic aromatic radical of the benzene series" is defined as inclusive of such radicals as phenyl, halophenyl, nitrophenyl, alkylphenyl, alkoxyphenyl, dialkylaminophenyl and acylphenyl. In the latter definition, halo refers to bromine, chlorine and iodine and the terms alkyl, alkoxy and acyl refer to radicals containing one and two carbon atoms.

These new compounds are crystalline solids or viscous liquids which are somewhat soluble in many organic solvents and of low solubility in water. They are useful as intermediates for the preparation in excellent yields of the isothiocyanates corresponding to the salts of the dithiocarbanilic acids. In such use, substantially equimolecular proportions of the trialkylamine salt of the dithiocarbanilic acid, sodium hydroxide and lead nitrate are mixed and blended together in water at temperatures of from 20° to 45° C. Following the reaction, the reaction mixture may be steam distilled to separate the corresponding isothiocyanate as a crystalline solid or viscous liquid. The new trialkylamine salts of the dithiocarbanilic acids also are useful as parasiticides and adapted to be employed as active toxic constituents of compositions for the control of insects, bacteria and fungi.

The new trialkylamine salts of the dithiocarbanilic acids may be prepared by reacting together (1) carbon disulfide, (2) a tertiary amine of the formula

and (3) an arylamine of the formula R—NH$_2$. The reaction conveniently is carried out in an inert organic solvent in which the desired trialkylammonium dithiocarbanilate is insoluble, and preferably in a low boiling solvent such as diethyl ether, isopropyl ether and n-pentane. Good results are obtained when substantially equimolecular proportions of the reactants are employed. In a preferred operation, optimum yields are obtained when employing small excesses in the amount of about ten percent each of the tertiary amine and carbon disulfide reagents.

In the foregoing method, the tertiaryamine and arylamine may be dispersed in the reaction solvent and the carbon disulfide added portionwise thereto. In an alternative procedure, the carbon disulfide, tertiaryamine and arylamine are combined and blended together in the reaction solvent. The reaction is oftentimes somewhat exothermic and takes place smoothly at temperatures of from 20° to 50° C. The temperature may be controlled by the addition or subtraction of heat as may be required. In a convenient method of operation, the reaction is carried out at the boiling temperature of the reaction mixture and under reflux. During the reaction, the desired product separates in the reaction mixture as a viscous liquid or crystalline solid. The latter may be separated by decantation or filtration and thereafter purified by conventional methods.

The following examples illustrate the invention and are not to be construed as limiting:

*Example 1.*—Triethylamine salt of 2-methyldithiocarbanilic acid

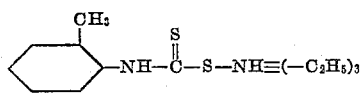

107.2 grams (1 mole) of o-toluidine, 111.3 grams (1.1 moles) of triethylamine, 83.8 grams (1.1 moles) of carbon disulfide and 500 milliliters of n-pentane were placed in a reactor equipped with a stirrer and condenser. With the stirrer operating the mixture was heated at the boiling temperature. During the heating an oil phase began separating in the mixture and started to solidify after about 15 minutes. Stirring was thereafter continued and the mixture maintained at the boiling temperature for about three hours to complete the reaction. The reaction mixture was then filtered to separate a triethylammonium 2-methyldithiocarbanilate product as a crystalline residue. The latter was obtained in a yield of 68.6 percent. The product melted at from 72° to 76° C. and contained nitrogen and sulfur contents of 9.5 and 22.08 percent, respectively, as compared to theoretical contents of 9.85 and 22.5 percent.

*Example 2.*—Triethylamine salt of 4-chlorodithiocarbanilic acid

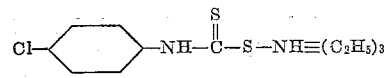

76.6 grams (0.6 mole) of p-chloroaniline, 50.2 grams (0.66 mole) of carbon disulfide, 133.5 grams (1.32 moles) of triethylamine and 500 milliliters of diethyl ether were placed in a reactor equipped with stirrer and condenser. With the stirrer operating, the mixture was heated at the boiling temperature. During the heating an oil phase began separating in the mixture and started to solidify after about one-half hour. Stirring was thereafter continued and the mixture maintained at the boiling temperature for about 3.5 hours and thereafter set aside for 16 hours at room temperature to complete the reaction. The reaction mixture was then filtered to separate a triethylammonium 4-chlorodithiocarbanilate product as a crystalline solid melting at from 82° to 87° C. The latter was obtained in a yield of 68.4 percent and had sulfur, nitrogen and chlorine contents of 21.15, 9.18 and 11.62 percent, respectively, as compared to theoretical contents of 21.02, 9.19 and 11.63 percent.

*Example 3.*—Triethylamine salt of 3-nitrodithiocarbanilic acid

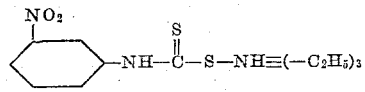

138.1 grams (1.0 mole) of 3-nitroaniline, 111.3 grams (1.1 moles) of triethylamine, 83.8 grams (1.1 moles) of carbon disulfide and 3 liters of diethyl ether were placed in a flask with agitation and allowed to stand at room temperature for 18 hours. An additional 1.1 moles of each of triethylamine and carbon disulfide were then added to the mixture with agitation and the resulting product set aside for several days at room temperature. During the latter period a triethylammonium 3-nitrodithiocarbanilate product precipitated as a crystalline solid and was separated by filtration. The separated product amounted to a yield of 44.3 percent. The product melted at from 89° to 92° C. and has sulfur and nitrogen contents of 20.4 and 13.1 percent, respectively, as compared to theoretical contents of 20.32 and 13.32 percent.

*Example 4.—Triethylamine salt of 3-acetyldithiocarbanilic acid*

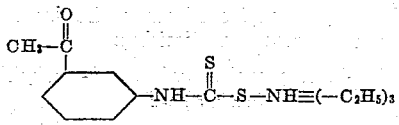

In a similar manner, m-acetyldithiocarbanilic acid, carbon disulfide and triethylamine were reacted together in diethyl ether to obtain a triethylammonium 3-acetyldithiocarbanilate product in a yield of 78 percent. The product melted at 77°–80° C. and had sulfur and nitrogen contents of 20.16 and 8.8 percent, respectively, as compared to theoretical contents of 20.59 and 9.0 percent.

*Example 5.—Triethylamine salt of 2-methoxydithiocarbanilic acid*

123.2 grams (1.0 mole) of o-anisidine, 83.8 grams (1.1 moles) of carbon disulfide, 111.3 grams (1.1 moles) of triethylamine and 0.5 liter of diisopropyl ether were placed in a flask with agitation and allowed to stand for about three hours at room temperature. During this period a triethylammonium 2-methoxydithiocarbanilate product separated and solidified as a crystalline solid. The product was recovered by filtration and found to melt at from 62° to 71° C. The product was obtained in a yield of 73.6 percent and contained sulfur and nitrogen contents of 20.8 and 9.3 percent, respectively, as compared to theoretical contents of 2.34 and 9.33 percent.

*Example 6.—Triethylamine salt of 5-chloro-2-methoxydithiocarbanilic acid*

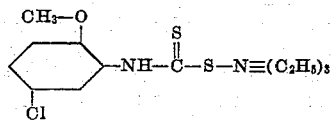

In a manner similar to that of the preceding example, 5-chloro-2-methoxyaniline, carbon disulfide and triethylamine were reacted together in diisopropyl ether to obtain a triethylammonium 5-chloro-2-methoxydithiocarbanilate product melting at from 76° to 81° C. The latter product was recovered in a yield of 72.5 percent and contained sulfur, nitrogen and chlorine contents of 19.0, 8.55 and 11.1 percent, respectively, as compared to theoretical contents of 19.15, 8.37 and 10.59 percent.

*Example 7.—Triethylamine salt of 4-(dimethylamino)-dithiocarbanilic acid*

100 grams (0.734 mole) of N,N-dimethyl-p-phenylenediamine, 61.4 grams (0.807 mole) of carbon disulfide, 81.7 grams (0.807 mole) of triethylamine and 0.75 liter of diisopropyl ether were placed in a flask and stirred for about three hours. During this period a triethylammonium 4-(dimethylamino)-dithiocarbanilate product precipitated in the mixture as a crystalline solid and was separated by filtration. The product was obtained in a yield of 88.2 percent and contained sulfur and nitrogen contents of 19.8 and 13.29 percent, respectively, as compared to theoretical contents of 20.5 and 13.4 percent.

*Example 8.—N,N-dimethyl N-dodecylamine salt of dithiocarbanilic acid*

18.6 grams (0.2 mole) of aniline, 16.8 grams (0.22 mole) of carbon disulfide, 47.0 grams (0.22 mole) of N,N-dimethyl N-dodecylamine and 100 milliliters of n-pentane were placed in a flask and agitated for about two hours. During the latter period, the reaction mixture separated into a solvent layer and an organic oil layer. The latter was separated by decantation to obtain an N,N-dimethyl N-dodecylammonium dithiocarbanilate product as a viscous liquid in a yield of 77.9 percent. The N,N-dimethyl N-dodecylamine salt of dithiocarbanilic acid has a molecular weight of 382.

*Example 9*

In the manner as described in Example 1, other salts of dithiocarbanilic acids may be prepared as follows:

A triethylammonium dithiocarbanilate product by reacting together aniline, carbon disulfide and triethylamine. This salt was a crystalline solid melting at from 79° to 84° C. and having nitrogen and sulfur contents of 10.36 and 22.9 percent, respectively, as compared to theoretical contents of 10.36 and 22.7 percent.

A triethylammonium 3-methyldithiocarbanilate product by reacting together m-toluidine, carbon disulfide and triethylamine. This salt was a crystalline solid melting at from 73.5° to 77.5° C. and having nitrogen and sulfur contents of 9.4 and 21.8 percent, respectively.

An N,N-diisopropyl N-hexylammonium 2,4-dimethyldithiocarbanilate product by reacting together 2,4-dimethylaniline, carbon disulfide and N,N-dipropyl N-hexylamine. This product has a molecular weight of 382.

A triethylammonium 2,6-dimethyldithiocarbanilate product by reacting together 2,6-dimethylaniline, carbon disulfide and triethylamine. This product was a crystalline solid melting at from 82° to 86° C. and having nitrogen and sulfur contents of 9.36 and 20.8 percent, respectively, as compared to theoretical contents of 9.39 and 21.48 percent.

A triethylammonium 2,4,5-trimethyldithiocarbanilate product by reacting together 2,4,5-trimethylaniline, carbon disulfide and triethylamine. This salt was a semisolid material having a nitrogen content of 8.71 as compared to a theoretical content of 8.97.

*Example 10*

In the manner as described in Example 2, other salts of dithiocarbanilic acids may be prepared as follows:

A trimethylammonium 3-iododithiocarbanilate product by reacting together m-iodoaniline, carbon disulfide and trimethylamine. This product has a molecular weight of 354.

A tripropylammonium 4-ethyldithiocarbanilate product by reacting together 4-ethylaniline, carbon disulfide and tripropylamine. This product has a molecular weight of 340.

A triethylammonium 2-chlorodithiocarbanilate product by reacting together o-chloroaniline, carbon disulfide and triethylamine. This salt was a crystalline solid melting at from 71° to 78° C. and having nitrogen and sulfur contents of 9.36 and 20.8, respectively.

A triethylammonium 3-chlorodithiocarbanilate product by reacting together m-chloroaniline, carbon disulfide and triethylamine. This salt was a crystalline solid melting at from 84° to 87° C. and having nitrogen and sulfur contents of 9.02 and 21.63 percent, respectively.

A triethylammonium 4-bromodithiocarbanilate product by reacting together p-bromoaniline, carbon disulfide and triethylamine. This salt melted at from 73° to 78° C. and had nitrogen and sulfur contents of 7.81 and 17.54 percent, respectively, as compared to theoretical contents of 8.02 and 18.35 percent.

A triethylammonium 3-bromodithiocarbanilate product by reacting together m-bromoaniline, carbon disulfide and triethylamine. This salt melted at from 70° to 77° C.

A triethylammonium 4-iododithiocarbanilate product by reacting together 4-iodoaniline, carbon disulfide and triethylamine. This salt melted at from 84° to 90° C. and had a sulfur content of 16.3 percent as compared to a theoretical content of 16.17 percent.

*Example 11*

In a manner comparable to that described in Example 5, other salts of dithiocarbanilic acids may be prepared as follows:

An N,N-diethyl N-octylammonium 3-ethoxydithiocarbanilate product having a molecular weight of 321 by reacting together 3-ethoxyaniline, carbon disulfide and N,N-diethyl N-octylamine.

A trimethylammonium 2,4-dimethoxydithiocarbanilate product having a molecular weight of 288 by reacting together 2,4-dimethoxyaniline, carbon disulfide and trimethylamine.

*Example 12.—Triethylamine salt of N-methyldithiocarbamic acid*

Triethylammonium N-methyldithiocarbanilate may be prepared in accordance with the methods herein disclosed. In a representative operation, 107.2 grams (1.0 mole) of N-methylaniline, 83.8 grams (1.1 moles) of carbon disulfide, 111.3 grams (1.1 moles) of triethylamine and 0.5 liter of diisopropyl ether were placed in a reactor and the mixture stirred for about 1.5 hours and thereafter set aside for about 20 hours. During the reaction a triethylammonium N-methyldithiocarbanilate product precipitated in the mixture as a crystalline solid. The latter was separated by filtration in a yield of 42.3 percent. The product melted at 65°–67° C. and had sulfur and nitrogen contents of 22.1 and 9.42 percent, respectively, as compared to theoretical contents of 22.55 and 9.85 percent.

The products of the preceding examples are useful as parasiticides and adapted to be employed in disinfectant and pesticide compositions. In such use, the compounds may be employed as constituents of solvent solutions and aqueous dispersions or emulsions, or in mixture with inert finely divided powders. In a representative operation against *Rhizoctonia solani* and *Fusarium* spp. substantially complete controls have been obtained with compositions containing ten parts by weight of triethylammonium 4-chlorodithiocarbanilate per million parts by weight of composition.

We claim:

1. A compound selected from the group consisting of triethyl ammonium N-methyl dithiocarbanilate and the compounds of the formula

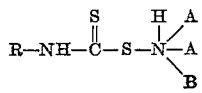

wherein R represents a non-acid aromatic radical of the benzene series, each A represents an alkyl radical containing from one to three carbon atoms, inclusive, and B represents an alkyl radical containing from one to 12 carbon atoms, inclusive.

2. Triethylammonium 4-chlorodithiocarbanilate.
3. Triethylammonium 4-bromodithiocarbanilate.
4. Triethylammonium dithiocarbanilate.
5. Triethylammonium 3-nitrodithiocarbanilate.
6. Triethylammonium N-methyldithiocarbanilate.

References Cited in the file of this patent

FOREIGN PATENTS 541,048    Great Britain _____ Nov. 11, 1941

OTHER REFERENCES

Losanitsch: Berichte, vol. 40, p. 2977 (1907).
Potts: Chem. Abstracts, vol. 38, p. 2398 (1944).

UNITED STATES PATENT OFFICE
CERTIFICATE OF CORRECTION

Patent No. 2,827,483                         March 18, 1958

Bryant C. Fischback et al.

It is hereby certified that error appears in the printed specification of the above numbered patent requiring correction and that the Letters Patent should read as corrected below.

Column 3, line 43, for "2.34" read -- 21.34 --.

Signed and sealed this 15th day of July 1958.

(SEAL)

Attest:
KARL H. AXLINE

Attesting Officer

ROBERT C. WATSON
Commissioner of Patents